(12) United States Patent
Garcia (10) Patent No.: US 6,272,474 B1
(45) Date of Patent: Aug. 7, 2001

(54) METHOD FOR MONITORING AND TRADING STOCKS VIA THE INTERNET DISPLAYING BID/ASK TRADE BARS

(76) Inventor: Crisostomo B. Garcia, P.O. Box 9248, Rancho Santa Fe, CA (US) 92067

(*) Notice: Subject to any disclaimer, the term of this patent is extended or adjusted under 35 U.S.C. 154(b) by 0 days.

(21) Appl. No.: 09/246,304

(22) Filed: Feb. 8, 1999

(51) Int. Cl.[7] ............................................. G06F 17/60
(52) U.S. Cl. ............................. 705/37; 705/35; 705/36
(58) Field of Search ................................. 705/35, 36, 37

(56) References Cited

U.S. PATENT DOCUMENTS 5,347,452 * 9/1994 Bay, Jr. ................................. 364/408

FOREIGN PATENT DOCUMENTS

410247210A * 3/1997 (JP) ........................................... 17/60

OTHER PUBLICATIONS

Etzkorn, Mark. Software Jungle, Part II. Futures: News, Analysis & Strategies for Futures, Options and Derivatives Traders. vol. 27, Issue 10, p. 58, Oct. 1998.*
Gold, Howard. Reading Charts by Candlelight. Barron's. p. 59, Jan. 30, 1995.*
Methany, Brad. East Meets West. Futures: News, Analysis & Strategies for Futures, Options and Derivatives Traders. vol. 28, Issue 2, p. 38, Feb. 1999.*
Wagner, Gary. Candlestick Probability. Futures: News, Analysis & Strategies for Futures, Options and Derivatives Traders. vol. 26, Issue 1, p 38, Jan. 1997.*

* cited by examiner

Primary Examiner—Robert W. Downs
Assistant Examiner—Steven R Wasylchak
(74) Attorney, Agent, or Firm—John R. Ross; John R. Ross, III (57) ABSTRACT

A method for providing stock information to traders. Stock information is received that includes bid offers, ask offers, the size of the bid offers and the size of the ask offers and the identity of the market makers making each offer. In addition, trade information is received that includes the volume of each trade, the time of each trade, and the price of each trade. The stock information and trade information are displayed on a display screen. The display screen includes a display of bid/ask trade bars for a stock or each of selected number of stocks in which percentage of sales at bid prices and percentage of sales at ask prices are depicted. By considering the display screen, traders are better able to determine trading patterns of the market makers in those selected stocks and increase their probability of buying low and selling high. In a preferred embodiment, the bid/ask trade bars include the following information: the percentage of trades at the ask prices, the percentage of trades at the bid prices, the percentage of trades between the ask and the bid, the bid-to-ask ratio, the volume of trades over a given interval. In a preferred embodiment, the bid/ask bar information can be filtered to represent the trading activity of all of the agents or a specified group of market makers or ECNs. Also, in a preferred embodiment, the stock information and trade information are received at a web site, and the traders who view the display screen are online traders having access to the Internet.

18 Claims, 6 Drawing Sheets

FIG. 1
PRIOR ART

PRIOR ART

LEVEL II SCREEN XYZ

| PRICE | SIZE | TIME | MM | BID | SIZE | MM | ASK | SIZE |
|---|---|---|---|---|---|---|---|---|
| 100 8/16 | 2500 | 11:13 | ABC | 100 7/16 | 200 | KLM | 100 10/16 | 230 |
| 100 7/16 | 2000 | 11:12 | DEF | 100 7/16 | 10 | GEB | 100 10/16 | 130 |
| 100 7/16 | 2000 | 11:11 | FED | 100 5/16 | 330 | GEB | 100 12/16 | 280 |
| 100 7/16 | 1200 | 11:10 | GEB | 100 5/16 | 75 | NOP | 100 12/16 | 440 |
| 100 7/16 | 1000 | 11:10 | HIJ | 100 4/16 | 10 | HIJ | 100 14/16 | 80 |
| 100 9/16 | 1200 | 11:09 | | | | | | |
| 100 7/16 | 1000 | 11:08 | | | | | | |
| 100 7/16 | 2000 | 11:04 | | | | | | |
| 100 6/16 | 1000 | 11:02 | | | | | | |
| 100 7/16 | 1000 | 11:00 | | | | | | |

LEVEL II SCREEN
XYZ

| PRICE | SIZE | TIME | MM | BID | SIZE | MM | ASK | SIZE |
|---|---|---|---|---|---|---|---|---|
| 100 8/16 | 2500 | 11:13 | ABC | 100 7/16 | 200 | KLM | 100 10/16 | 230 |
| 100 7/16 | 2000 | 11:12 | DEF | 100 7/16 | 10 | GEB | 100 10/16 | 130 |
| 100 7/16 | 2000 | 11:11 | FED | 100 5/16 | 330 | GEB | 100 12/16 | 280 |
| 100 7/16 | 1200 | 11:10 | GEB | 100 5/16 | 75 | NOP | 100 12/16 | 440 |
| 100 7/16 | 1000 | 11:10 | HIJ | 100 4/16 | 10 | HIJ | 100 14/16 | 80 |
| 100 9/16 | 1200 | 11:09 | | | | | | |
| 100 7/16 | 1000 | 11:08 | | | | | | |
| 100 7/16 | 2000 | 11:04 | | | | | | |
| 100 6/16 | 1000 | 11:02 | | | | | | |
| 100 7/16 | 1000 | 11:00 | | | | | | |

11:10

| G | W | R |
|---|---|---|
| 15% | 13% | 72% |

— 2

AGENT - ALL
BID-TO-ASK RATIO: 4.8:1

METHOD FOR MONITORING AND TRADING STOCKS VIA THE INTERNET DISPLAYING BID/ASK TRADE BARS

This invention relates to methods for dealing in the stock market and in particular to such methods involving the monitoring of stocks on the Internet.

BACKGROUND OF THE INVENTION

Investment Strategy

The best technique for making money in the stock market can be summed up in four small words: buy low, sell high. A successful investor is someone who can buy low and sell high enough so that he comes out ahead at the end of his transactions. There are three basic investment strategies to which investors commonly subscribe in their efforts to try to buy low, sell high: (1) pure fundamental analysis, (2) pure technical analysis, and (3) a combination of fundamental and technical analysis.

Fundamental Analysis Strategy

Otherwise known as the value method of investing, a fundamental analysis strategy is the investment in stocks on the basis of the value of the companies represented by the stocks. The company's balance sheet, income statement, and the like, are studied to help determine the financial and market position of the company. If the analysis of the company's historic growth and profit patterns show a steadily growing organization, and the research of the organization and its markets show a company that is competent and sound, a fundamental analysis approach should conclude that the company will continue to grow and prosper in the future.

Technical Analysis Strategy

The technical analysis strategy is a favorite of market timers. These are investors who try to make profits based on the short-term swings of the market. Market timers range from day traders, who try to take advantage of hourly or daily price changes to make a profit, to slightly longer-term investors who track stock price and trading volume fluctuations over a period of a few days or weeks and trade on the basis of recent trends. As opposed to fundamental analysis where the emphasis is on the strength of the underlying corporation, technical analysis focuses on patterns that appear on the historical price charts of a specific stock and of the stock market in general in order to help predict the future of that stock's price. This strategy is based on the theory that certain patterns of stock prices tend to repeat themselves over time.

Combination Fundamental and Technical Analysis Strategy

A third investment strategy combines elements of both fundamental and technical analysis. An investor following this strategy will research companies until he finds one that he feels is competent, sound and looks like it will continue to prosper in the future. However, before buying stock in it, he will look at historic price charts to help him determine the best moment to buy. Based on the price chart, the investor may decide to wait a few days, weeks or months before buying the stock.

The Internet

The Internet is a large connection of interconnected computers. Initially developed by the United States Defense Department, it has recently expanded to a great variety of uses and is growing rapidly. A significant percentage of the population in the United States and in many other countries currently has access to the Internet and uses it frequently. Internet users continue to grow rapidly.

Many companies have web sites and encourage potential customers to visit these sites. Creation of web sites is a well-developed Internet business with many people and organizations offering to create web sites. In addition, many books are available providing instructions for individuals to create their own web sites.

Web site owners use their web sites for varying purposes. Some of these purposes include advertising products or services, providing information, or for selling products or services. More specifically, in recent years the Internet has become a major means by which investors and brokers can both monitor the stock market and buy and sell stocks.

How the Internet Helps the Investor

Although an investor does not need to be online to buy stocks, the Internet can be of great value to him. The Internet offers resources that are unmatched by any single print source. A wired investor can get access to literally thousands of investment services, publications, newsletters, and discussion groups from the comfort of his living room or office. In this manner an investor can quickly gather a large amount of information about companies in which he is interested.

The Agents

Market Makers, Specialists and Electronic Communication Networks

Market makers, specialists and Electronic Communications Networks (ECNs) make market in stocks. Market makers are part of the National Association of Securities Dealers market (NASD), and specialists work on the New York Stock Exchange (NYSE) and other listed exchanges. An ECN is an electronic board where buy and sell orders may be posted by any investor worldwide. These agents serve a similar function but there are a number of differences between them.

Specialists

The New York Stock Exchange (NYSE) is the oldest stock exchange in the United States. The NYSE (as well as the Philadelphia, Chicago, Boston, and Pacific Stock Exchanges) uses an agency auction market system that is designed to allow the public to meet the public as much as possible. The majority of trading volume (approximately 90%) occurs with no intervention from the dealer. The responsibility of specialists is to make a fair and orderly market in the issues assigned to them. They must yield to public orders which means they may not trade for their own account when there are public bids and offers better than their own. The specialist has an affirmative obligation to eliminate imbalances of supply and demand when they occur. Specialists are required to make a continuous market. The exchange has strict guidelines for trading depth and continuity that must be observed. Specialists are subject to fines and censures if they fail to perform this function. NYSE specialists have large capital requirements and are overseen by Market Surveillance at the NYSE.

A specialist will typically maintain a narrow spread between offers to buy and offers to sell. Generally, the trader will need access to a professional's data feed before the trader can really see the size of the spread.

There are over a thousand NYSE members (i.e., seats), of which approximately a third are specialists. To date, there are over 3000 common and preferred stocks listed on the NYSE. On the average, each specialist handles 6 issues. The very big stocks will have a specialist devoted solely to them.

Every listed stock has one firm assigned to it on the floor. Most stocks are also listed on regional exchanges in San Francisco, Chicago, Philadelphia and Boston. All NYSE trading (approximately 80% of total volume) will occur at that post on the floor of the specialist assigned to it.

Market Makers

NASDAQ is an abbreviation for the National Association of Securities Dealers Automated Quotation system. The NASDAQ market is an interdealer market represented by over 600 securities dealers trading more than 15,000 different issues. These dealers are called market makers. Unlike the New York Stock Exchange (NYSE), the NASDAQ market does not operate as an auction market. Instead, market makers are expected to compete against each other by posting the best quotes (best bid, i.e., best offer to buy, and best ask, i.e., best offer to sell).

A NASDAQ Level II quotation system shows all the bid offers, ask offers, size of each offer (the order size), and the market makers making the offers. The order size is simply the number of shares the market maker is prepared to fill at that price. Since about 1985 the average person has had access to Level II quotes.

The Small Order Execution System (SOES) was implemented by NASDAQ following the 1987 market crash. This system is intended to help the small investor have his or her transactions executed without allowing market makers to take advantage of said small investor. The trader may see mention of "SOES Bandits" which is slang for people who day-trade stocks on the NASDAQ using the SOES, scalping profits on the spreads.

A firm can become a market maker on NASDAQ by applying to NASD. The requirements include certain capital requirements, electronic interfaces, and a willingness to make a two-sided market. The trader must be there every day. If the trader doesn't post continuous bids and offers every day the trader can be penalized and not allowed to make a market for a month. Market makers are regulated by the NASD, which is overseen by the SEC.

The brokerage firm can handle customer orders either as a broker or as a dealer/principal. When the brokerage acts as a broker, it simply arranges the trade between buyer and seller, and charges a commission for its services. When the brokerage acts as a dealer/principal, it's either buying for or selling from its own account (to or from the customer), or acting as a market maker. The customer is charged either a mark-up or a mark-down, depending on whether they are buying or selling. The brokerage is disallowed from charging both a mark-up (or mark-down) and a commission. Whether acting as a broker or as a dealer/principal, the brokerage is required to disclose its role in the transaction. However, dealers/principals are not necessarily required to disclose the amount of the mark-up or mark-down, although most do this automatically on the confirmation as a matter of policy. Despite its role in the transaction, the firm must be able to display that it made every effort to obtain the best posted price. Whenever there is a question about the execution price of a trade, it is usually best to ask the firm to produce a Time and Sales report, which will allow the customer to compare all execution prices with their own.

In NASDAQ, the public almost always meets the dealer making it nearly impossible to buy on the bid or sell on the ask. Dealers can buy on the bid even though the public is bidding. Despite the requirement of making a market, in the case of market makers there is no one firm who has to take responsibility if trading is not fair or orderly, as what seemed to have happened during the crash of 1987. At that time, many NASD firms simply stopped making markets or answering phones until the dust settled.

Electronic Communication Networks

Recently, Electronic Communication Networks (ECN) were established in order to allow investors to trade NASDAQ listed stocks without having to go through market makers, oftentimes resulting in better fills for the investor. An ECN is an electronic board where buy and sell orders may be posted by any investor worldwide. The best bid and best ask orders from the ECN are posted in the NASDAQ system alongside those of market makers.

Bid, Ask, and Spread

If a trader wants to buy or sell a stock or other security in the open market, he normally trades via agents on the market scene who specialize in that particular security. These people stand ready to sell the trader a security for some asking price (the "ask") if the trader would like to buy it. Or, if the trader owns the security and would like to sell it, the agent will buy the security from the trader for the bid price (the "bid"). The difference between the best bid and the best ask is called the spread. Stocks that are heavily traded tend to have very narrow spreads (e.g., $\frac{1}{8}$ of a point), but stocks that are lightly traded can have spreads that are significant, even as high as several dollars.

The width of the spread is indicative of the stock's liquidity. Liquidity basically measures the willingness of investors to buy or sell significant quantities of a security at any time. In the stock market, market makers or specialists (depending on the exchange) buy stocks from the public at the bid and sell stocks to the public at the ask (called "making a market in the stock"). At most times (unless the market is crashing, etc.) these people stand ready to make a market in most stocks and often in substantial quantities, thereby maintaining market liquidity.

Dealers make their living by taking a large part of the spread on each transaction—they normally are not long-term investors. In fact, they work a lot like the local supermarket, raising and lowering prices on their inventory as the market moves, and making a few cents here and there.

Online Trading Over the Internet

There are two types of online trading available to the public. The first type is Internet trading provided by firms that route the trader's order to a trading desk or to a third party willing to pay for order flow. The other type of Internet trading is a dedicated online service provided by firms where orders go directly to the exchange yielding a quick and efficient execution.

The Data

If the online investor is of the first type discussed above, his order may be gamed by a specialist or market maker handling the order. Unfortunately, if this happens to the trader, he will not recognize it from the minimal information provided in the order confirmation. At best, he knows only what's called Level I data—the best bid, the best ask, the last trade, and the order size of each data respectively.

If the trader is of the second type (i.e., his order goes from the firm directly to the exchange), the trader most likely is looking at a NASDAQ Level II screen. The screen shows all the bid offers, ask offers, the recent trades, the size of each offer or trade, and the market makers and ECNs making the offers.

The Current State of Using Technical Analysis Online

Currently, an online trader connected to a web site that has a screen that displays NASDAQ Level II data, will see the following information streaming continuously to his screen: all bid offers, all ask offers, all trades, the size of each offer or trade and the market maker or ECN making the offer. This data is refreshed by as much as ten times per second. Hence, many traders end up being glued to their screen all day. Moreover, unless the trader has a prodigious memory, a lot of important data will escape his notice. Occasionally, impatience at waiting may cause a trade at an inopportune moment.

Prior Art Web Site Displays

Figure 1:
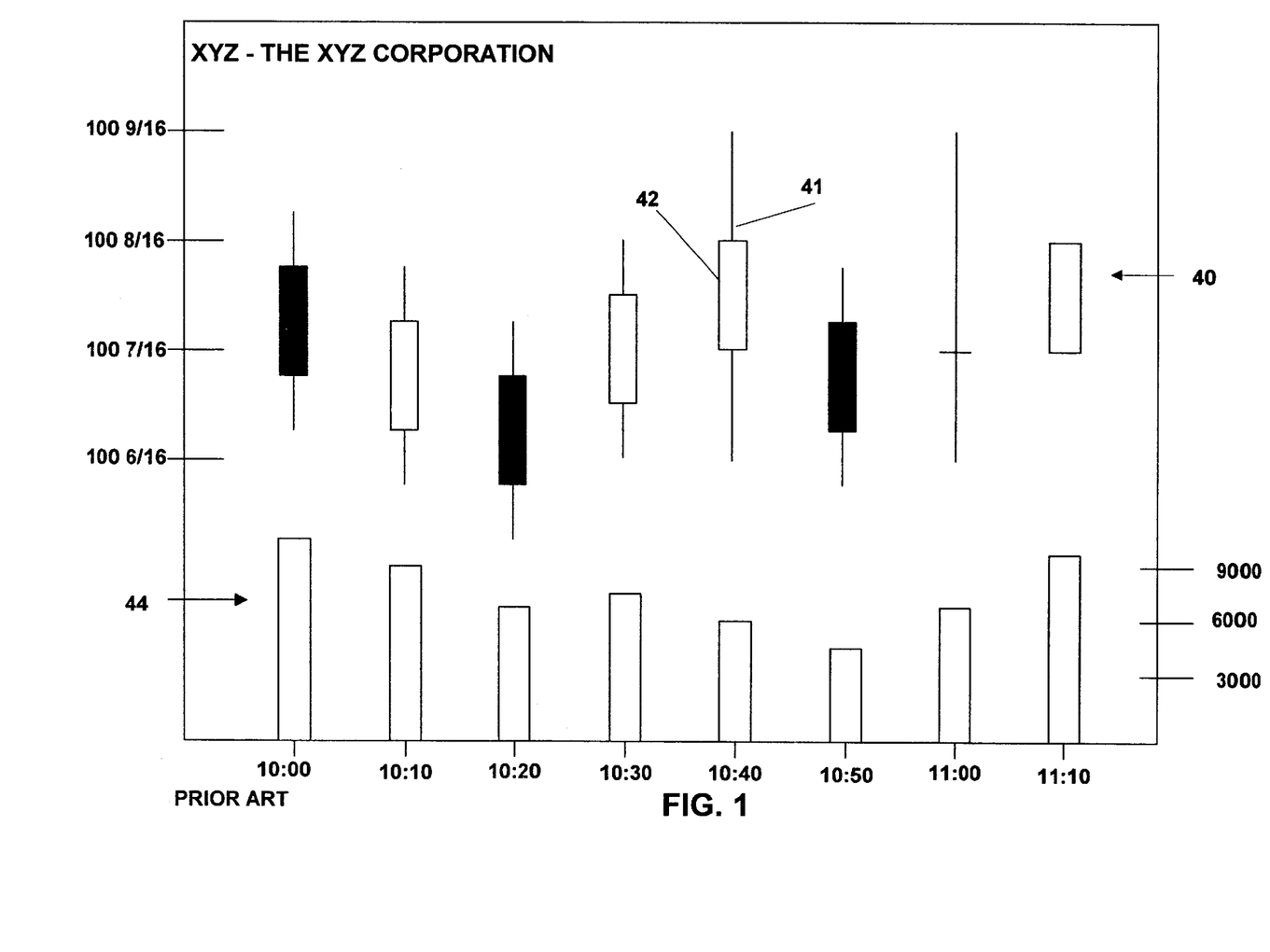
FIG. 1 shows a prior art candlestick price-volume chart.
Figure 2:
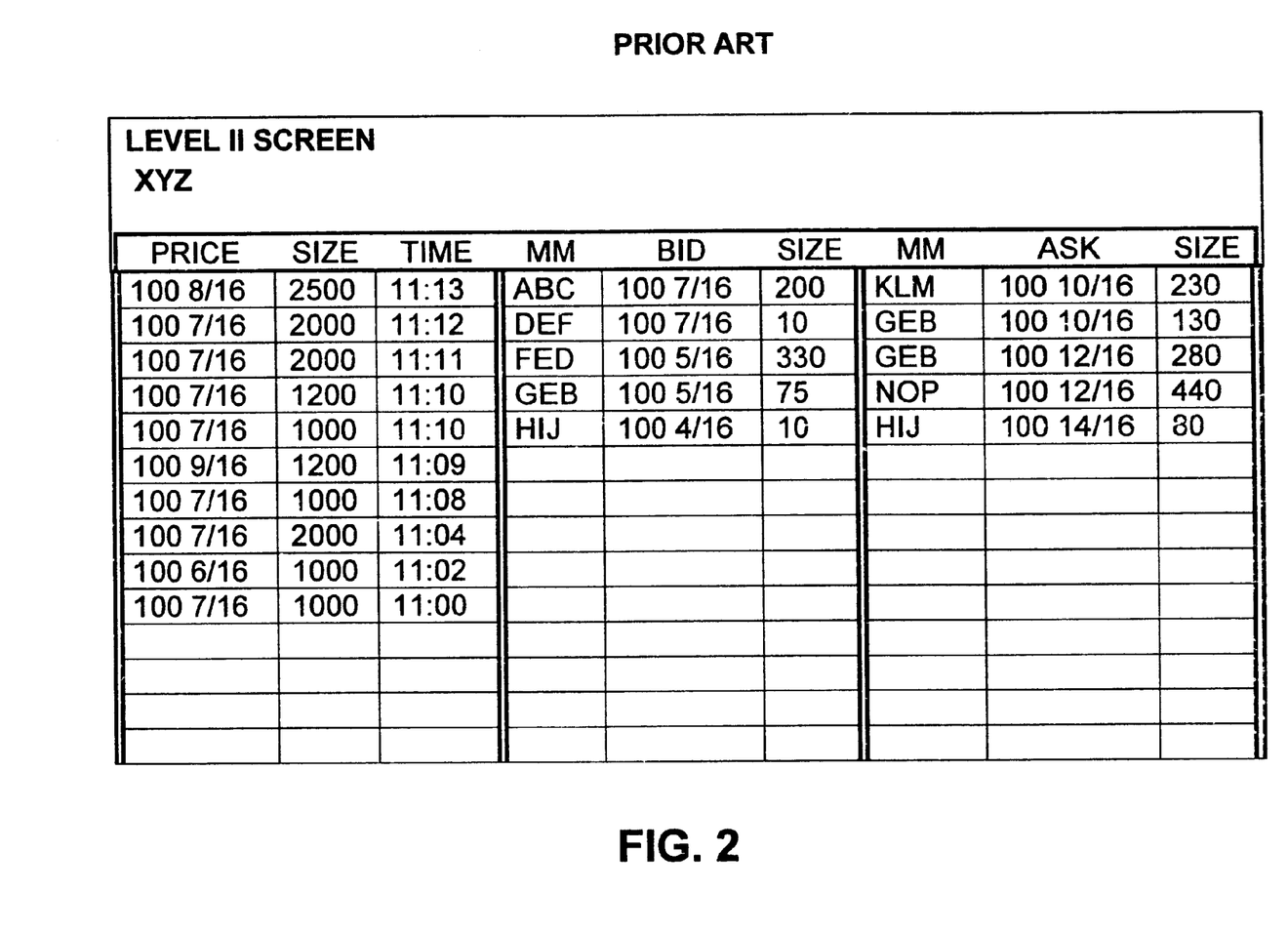
FIG. 2 shows a prior art Level II screen.

Many web sites portray stock trading information in chart form to help traders make buy/sell decisions. FIG. 1 shows a prior art candlestick price-volume chart. The prices of XYZ stock are shown at 40. The high and the low sale price during the 10 minute interval following the time indicated is depicted by line 41, the opening and closing prices during the 10 minute interval is depicted by rectangle 42. The rectangle is white if the opening price is lower than the closing price and black if the closing price is lower than the opening price. The volume traded during the 10 minute interval is shown at 44. Moreover, a few broker/dealers provide NASDAQ Level II to very active traders on the web. FIG. 2 shows a prior art Level II screen. In FIG. 1, the price scale is on the left and the volume scale is on the right. The time interval can be varied by the trader on his computer and is displayed on the bottom. In FIG. 1, for example, for the ten minute time interval starting at 10:40, a trader can determine the following information: (1) the market opened at 100 7/16 and closed at 100 8/16, the low was 100 6/16 and the high was 100 9/16, and (2) about 6000 shares were traded. A trader can also confirm this historical data by looking at the left-hand column of FIG. 2.

Assume the current time is 11:15. FIG. 2 shows that during the time interval starting at 11:10, already over 8700 shares have been traded. The interval opened at the low of 100 7/16 and is currently at the high of 100 8/16. A prior art online trader may therefore conclude that there is an increasing demand for the stock and he should buy. However, other information not easily discernible from the information displayed in FIGS. 1 and 2 could result in a contrary decision.

What is needed is a better online trading method.

SUMMARY OF THE INVENTION

The present invention provides a method for providing stock information to traders. Stock information is received that includes bid offers, ask offers, the size of the bid offers and the size of the ask offers and the identity of the market makers making each offer. In addition, trade information is received that includes the volume of each trade, the time of each trade, and the price of each trade. The stock information and trade information are displayed on a display screen. The display screen includes a display of bid/ask trade bars for a stock or each of selected number of stocks in which percentage of sales at bid prices and percentage of sales at ask prices are depicted. By considering the display screen, traders are better able to determine trading patterns of the market makers in those selected stocks and increase their probability of buying low and selling high.

In a preferred embodiment, the bid/ask trade bars include the following information: the percentage of trades at the ask prices, the percentage of trades at the bid prices, the percentage of trades between the ask and the bid, the bid-to-ask ratio, the volume of trades over a given interval. In a preferred embodiment, the bid/ask bar information can be filtered to represent the trading activity of all of the agents or a specified group of market makers or ECNs. Also, in a preferred embodiment, the stock information and trade information are received at a web site, and the traders who view the display screen are online traders having access to the Internet.

DETAILED DESCRIPTION OF THE PREFERRED EMBODIMENT

Figure 3:
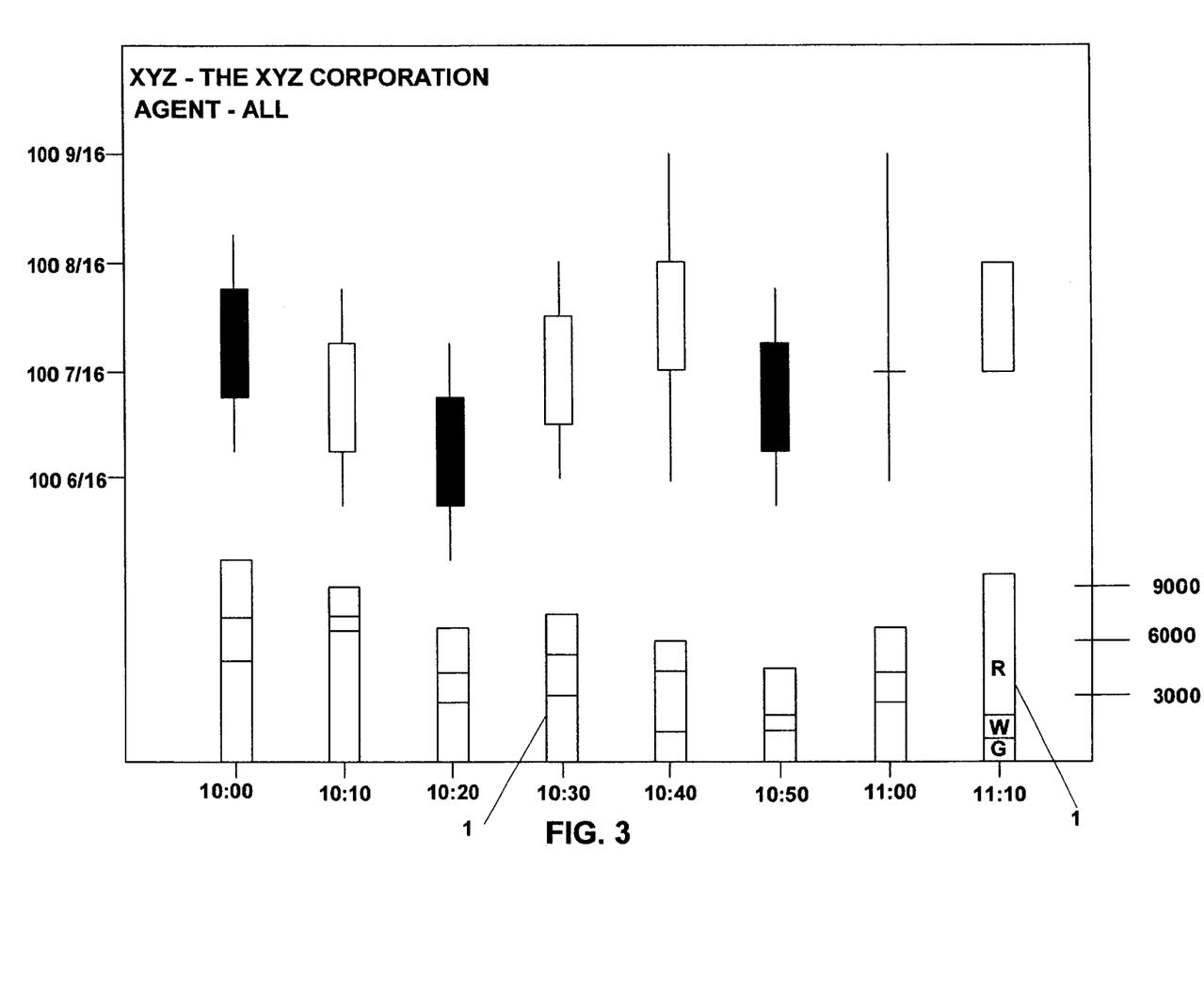
FIG. 3 shows a preferred candlestick price-volume chart selected for all agents.
Figure 4:
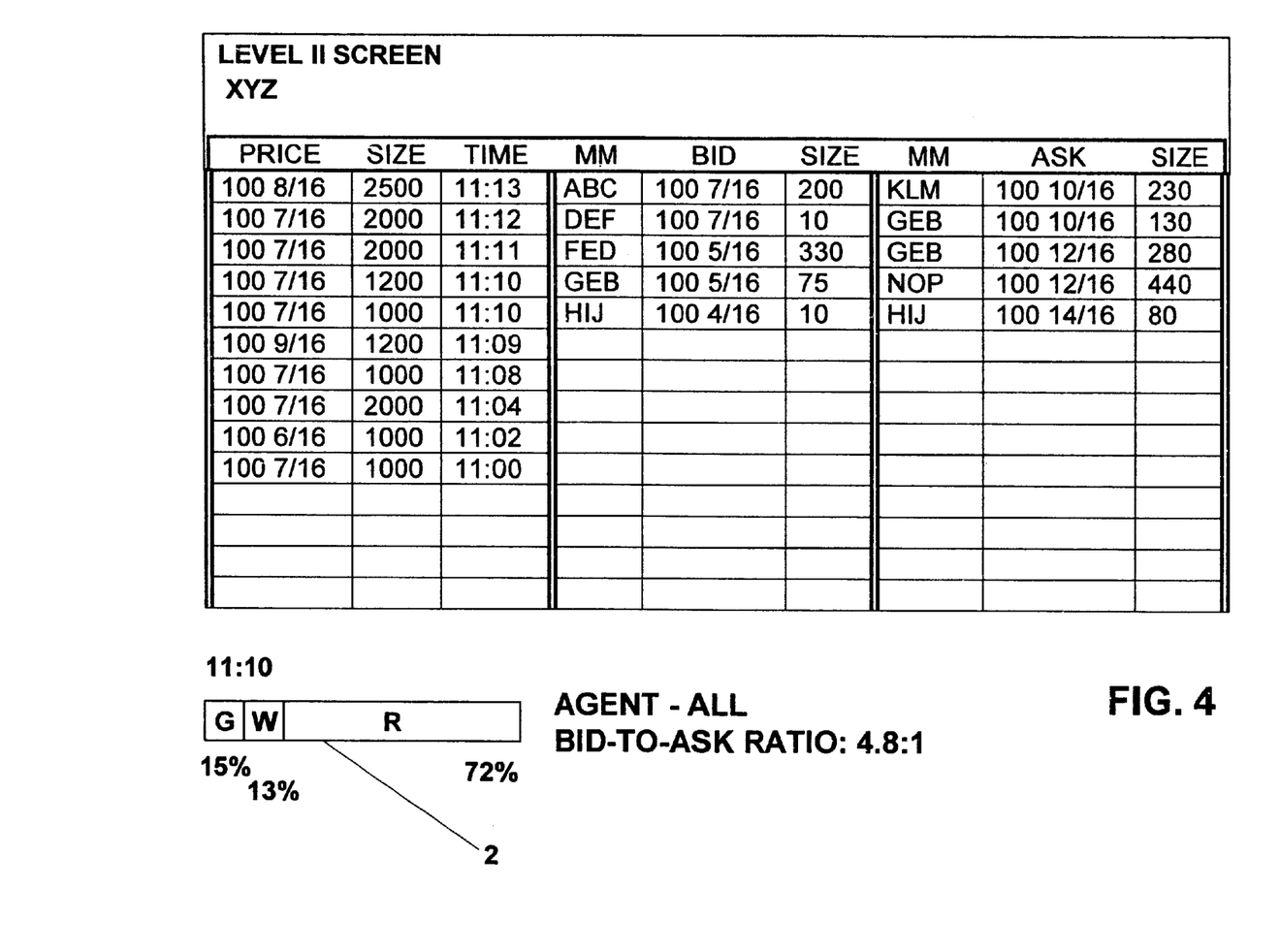
FIG. 4 shows a preferred Level II screen.

In the first preferred embodiment, traders pay the web site owner a fee. This entitles the traders to log in on the web site. The traders are Internet users and access the web site typically using their home computers and a browser program. When traders have completed their log in, they will observe screens similar to those shown in FIGS. 3 and 4. FIG. 3 shows a preferred candlestick price-volume chart and FIG. 4 shows a preferred Level II screen.

The web site collects NASDAQ Level II data and stores it. NASDAQ Level II data is routed to the web site owner through the Internet by a NASDAQ Level II data provider. A preferred provider of this information is PcQuote, Inc., with offices at 300 South Wacker drive, Suite 300, Chicago, Ill. 60606, and a web address of www.pcquote.com.

First Preferred Embodiment

Bid/Ask Trade Bars

The first preferred embodiment of the present invention modifies the prior art trading screens by adding bid/ask trade bars 1 as shown in FIG. 3. Bid/Ask trade bar 1 is a modification of the prior art volume bar 2 as shown in FIG. 1. Bid/ask trade bars 1 comprise three sections to supply the online trader with new information currently unavailable in the prior art. The top section of the volume bar is color coded red to indicate the percentage of sales that occurred at the bid prices or lower. The bottom section of the volume bar is color coded green to indicate the percentage of sales that occurred at the ask prices or higher. (When traders are afraid of not getting filled, they can SOES the second best bid or ask so as to assure a fill. Therefore, it is possible for trades to occur at the ask price or higher or the bid price or lower.) The middle section of the volume bar is color coded white to indicate the percentage of sales that have occurred between the bid and the ask. For example, in FIG. 3, bid/ask trade bar 1 over the 11:10 time interval is mostly red. This indicates that a majority of trades during that time interval occurred at the bid price. In other words, more bids than asks have been taken out, indicating that the market has an overall tendency to sell the stock, i.e., sellers are more eager to sell than buyers are to buy. This could be a strong indication that the price of the stock is going to decrease in the near future.

Figure 5:
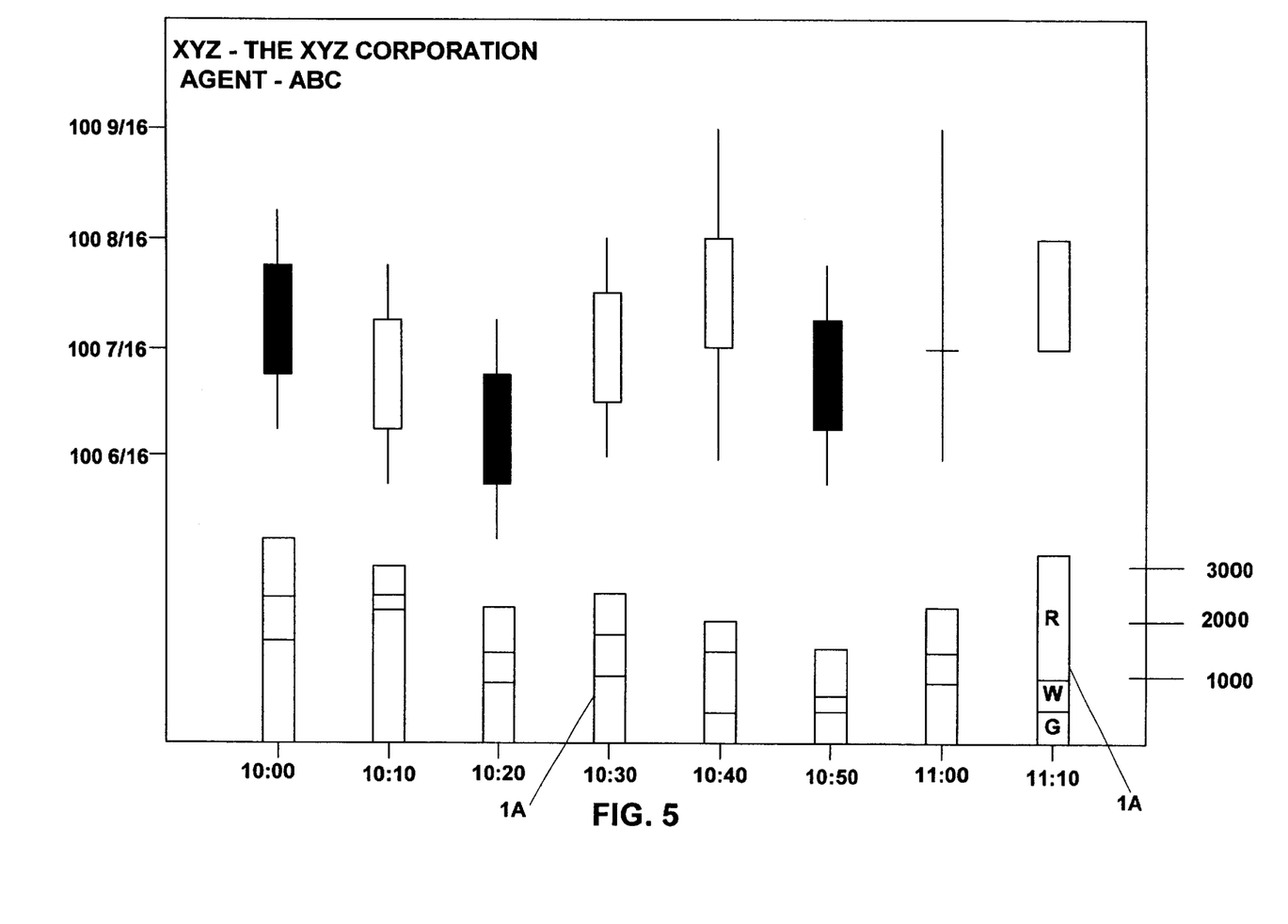
FIGS. 5 and 6 shows a preferred candlestick price-volume chart selected for a particular agent.
Figure 6:
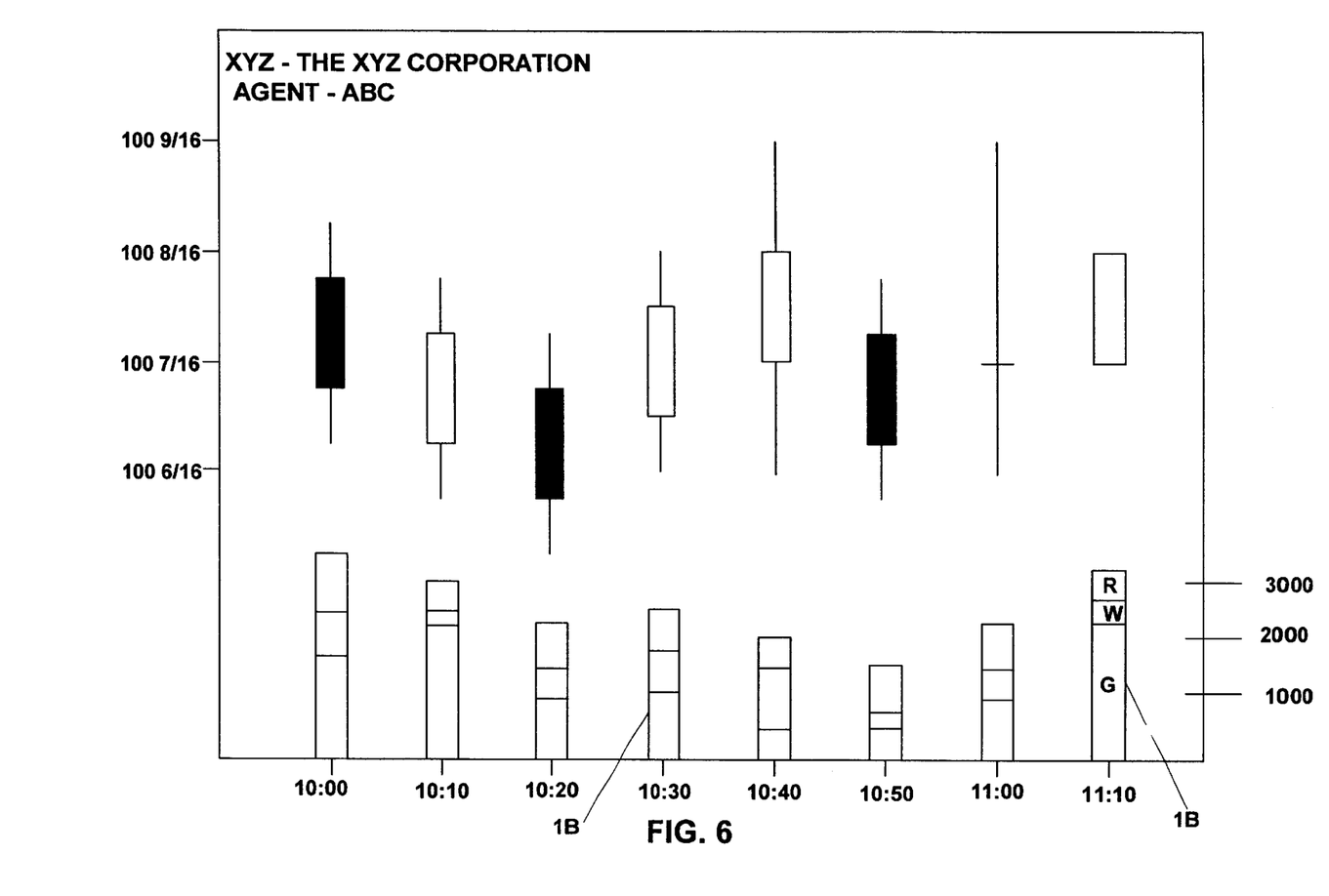

A trader can vary whose trades are represented by bid/ask trade bar 1. An online trader has the option to display bid/ask trade bar 1 for all trades, trades of a particular group of market makers or ECNs, or trades only of a specific market maker or ECN. For example, FIG. 3 shows "AGENT—ALL", indicating that bid/ask trade bar 1 is showing the volume of all trades. On the other hand, if only the trades of a particular market maker are desired, say Mr. ABC, then "AGENT—ABC" will be displayed as shown in FIGS. 5 and 6, and the bid/ask trade bar will show only Mr. ABC's trades.

This latter feature allows the trader to distinguish the market maker's behavior from that of the market. For example, recall that the online trader's first instinct may be to sell if the trader finds bid/ask trade bar 1 to be mostly red (a majority of the trades are occurring at the bid). Also note that the trader's information is improved by knowing the actions of the dominant market maker.

Referring again to FIG. 3, the reader should note that bid/ask trade bar 1 over the 10 minute time interval beginning at 11:10 is mostly red. However, bid/ask trade bar 1 in FIG. 3 represents all the agents in the market. Before deciding to sell, the trader should also consider what the dominant agent is doing. If Mr. ABC is the dominant agent for XYZ stock, the trader should select ABC in the upper left hand corner of the screen, as shown in FIG. 5. Now, bid/ask trade bar IA is representative of just the trades of ABC. As indicated in FIG. 5 by the fact that bid/ask trade bar 1A is mostly red, most of ABC's trades are being taken out at the bid. In other words, ABC sees more trades are taking place at the lower bid price (indicating to ABC a downward trend), but nevertheless, ABC is not taking his opportunity to sell. In fact, he is buying. Therefore, because the dominant agent is not selling and is buying, the online trader may decide that in spite of the fact that a majority of trades are occurring at the bid, he should follow the lead of the dominant agent and not sell, or perhaps buy more shares for himself.

FIG. 6 shows a price-volume chart similar to FIG. 5, except now bid/ask trade bar 1B for ABC shows that his trades are mostly at the ask (i.e., bid/ask trade bar 1B is mostly green). In this scenario, the online trader may first have observed the screen shown in FIG. 3 and noted that a large volume of trading has occurred at the 11:10 interval and was mostly red, indicating a downward price pressure. The online trader, knowing that ABC is the dominant agent for XYZ stock, selects ABC in the top left hand corner of the screen shown in FIG. 6. Then, bid/ask trade bar 1B over the 11:10 time interval is mostly green. This indicates that ABC's trades are mostly at the ask. Therefore, the online trader is able to conclude that the market maker that is the dominant agent for XYZ stock is selling rather than buying. Hence the online trader's desire to sell (initially sparked by observing the screen shown in FIG. 3) is doubly reinforced by observing the screen in FIG. 6.

Second Preferred Embodiment

FIG. 4 shows a preferred Level II screen. Here, the online trader is able to observe at the bottom of the screen the current horizontal bid/ask trade bar 2 for all trades split into the three color-coded sections. In addition to the red, green and white color coding, there is also a numeric percentage display that indicates the exact percentage of trading at the bid, ask or between the bid and the ask. Also, a bid-to-ask ratio indicating the ratio of trading volume at the bid and the trading volume at the ask is displayed. As shown in FIG. 4, 72% of the trading has occurred at the bid with only 15% of the trading occurring at the ask. 13% has occurred in the middle. The bid-to-ask ratio is 4.8:1. Therefore, despite the fact that the price of the stock has gone up during the 11:10 interval and despite the fact that there has been an unusually large volume of sales, the online trader is now able to conclude that he should not buy. Because the bid-to-ask ratio is approximately 5:1, indicating heavy downward pressure, the prudent online trader will not buy, but instead sell or perhaps at least hold on to his stock.

Third Preferred Embodiment

The third preferred embodiment of the present invention is a combination of the improvements described by the first and second preferred embodiments. In other words, the online trader will be able to see both screens described by FIG. 3 and FIG. 4 at once.

While the above description contains many specifications, the reader should not construe these as limitations on the scope of the invention, but merely as exemplifications of preferred embodiments thereof. For example, although the above embodiments have discussed utilization of the present invention in an Internet setting, it is also possible to use the present invention independently of the Internet. A trader could receive NASDAQ Level II information at his private office and display it on screens similar to those shown in FIGS. 3–6. He could then make trade decisions based on information gathered from the bid/ask trade bars. Additionally, he could let others look at his screen so that they could make trade decisions as well. Potentially, he could charge a fee for this service. Those skilled in the art will envision many other possible variations that are within its scope. Accordingly the reader is requested to determine the scope of the invention by the appended claims and their legal equivalents, and not by the examples which have been given.

What is claimed is:

1. A method for providing stock information to traders, comprising the steps of:
   A) receiving stock information, said stock information comprising:
      1) bid offers,
      2) ask offers,
      3) size of said bid offers and said ask offers, and
      4) identity of the agents making each offer,
   B) receiving trade information, comprising:
      1) volume of each trade,
      2) time of said each trade, and
      3) price of said each trade, and
   C) displaying stock information and said trade information on a display screen, said screen comprising bid/ask trade bars,
   wherein by considering said display screen, the traders are able to determine a trading pattern of the agents.

2. A method as in claim 1, wherein said receiving of stock information and said receiving of trade information occurs at a web site, and wherein said displaying of the stock information and trade information is seen by traders having access to the Internet.

3. A method as in claim 2, further comprising the step of charging a fee to the traders having access to the Internet.

4. A method as in claim 1, wherein said bid/ask trade bars comprise:

A) a percentage of trades at the bid,

B) a percentage of trades at the ask, and

C) the total volume traded.

5. A method as in claim 1, wherein said bid/ask trade bars comprise:

A) a percentage of trades at the bid or lower,

B) a percentage of trades at the ask or higher, and

C) the total volume traded.

6. A method as in claim 5, wherein said bid/ask trade bars further comprise a percentage of trades occurring between said percentage of trades at the bid and said percentage of trades at the ask.

7. A method as in claim 5, wherein said bid/ask trade bars further comprise a ratio between said percentage of trades at the bid and said percentage of trades at the ask.

8. A method as in claim 5, wherein said bid/ask bars comprise:

1) a first section, and 2) a second section.

9. A method as in claim 8, wherein said first section represents said percentage of trades at the bid and is a first color and wherein said second section represents said percentage of trades at the bid and is a second color.

10. A method as in claim 9, wherein said first color is red and said second color is green.

11. A method as in claim 6, wherein said bid/ask bars comprise:

1) a first section, 2) a second section, and 3) a third section.

12. A method as in claim 11, wherein said first section represents said percentage of trades at the bid and is a first color and wherein said second section represents said percentage of trades at the bid and is a second color and wherein said third section represents a percentage of trades occurring between said percentage of trades at the bid and said percentage of trades at the ask and is a third color.

13. A method as in claim 9, wherein said first color is red, said second color is green and said third color is white.

14. A method as in claim 5, wherein said total volume traded is determined by the length of said bid/ask bar.

15. A method as in claim 1, wherein said bid/ask trade bars are representative of all the agents in the market.

16. A method as in claim 1, wherein said bid/ask trade bars are representative of a selected group of agents in the market.

17. A method as in claim 1, wherein said bid/ask trade bars are representative of the dominant agent for a particular stock.

18. A method as in claim 1, wherein said stock information is NASDAQ Level II information.

* * * * *